Sept. 26, 1933.    H. J. GROW    1,928,015
TRACER
Filed Jan. 24, 1930    2 Sheets-Sheet 1

Sept. 26, 1933.   H. J. GROW   1,928,015
TRACER
Filed Jan. 24, 1930   2 Sheets-Sheet 2
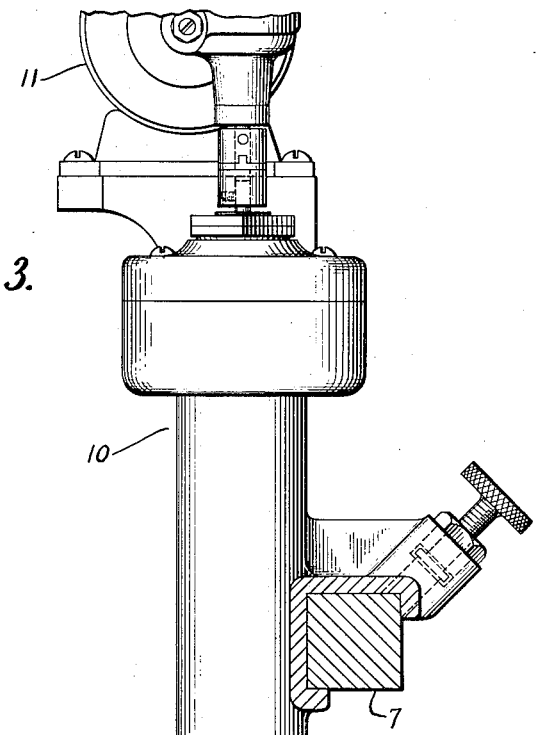
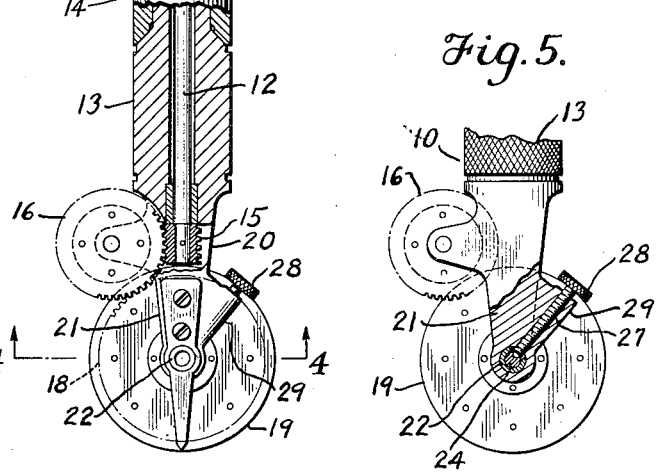
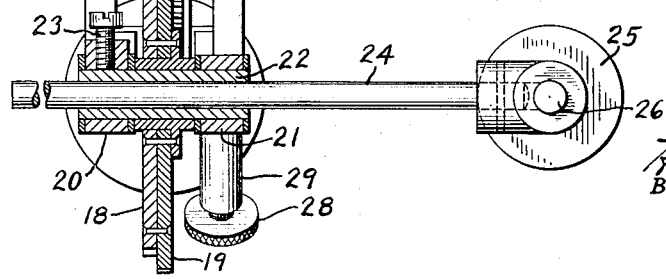

Patented Sept. 26, 1933

1,928,015

UNITED STATES PATENT OFFICE 1,928,015

TRACER

Harold J. Grow, East Orange, N. J., assignor to Air Reduction Company, Incorporated, New York, N. Y., a corporation of New York Application January 24, 1930. Serial No. 422,985

4 Claims. (Cl. 33—23)

The invention relates to welding and cutting apparatus, and more particularly to that class of machines in which a torch or other instrumentality is carried by a jointed frame or some equivalent thereof which enables the torch to have universal movement in a plane. A driven tracer connected with the frame or its equivalent and adapted to roll over a drawing or template causes the torch to move at uniform speed in any and changing directions in accordance with the design. Illustrations of such machines are disclosed in the Bucknam Patents 1,059,329 and 1,104,289, and various other forms of frames and mechanisms for supporting the torch while enabling it to be moved in all directions are known.

The driven tracer shown in the Bucknam patents has a single wheel, but two-wheel tracers driven through a differential gear are also known and serve the same purpose.

When the torch of such a machine is to describe circles or circular arcs, it is customary to attach a radius-rod and center to the tracer. With some tracers, it has been the practice to remove the axle of the tracer wheel and to replace it by the radius-rod, which then forms the support on which the wheel turns. While this enables the radius-rod to be inserted from either side of the wheel, and to be passed through it for any distance, depending upon the radius desired, the plan suffers from the disadvantage that the tracer has, in effect, to be disassembled and reassembled and that the axle proper may be mislaid or lost while the machine is being used for circular operations.

Another disadvantage of this prior practice is that the set-screw for securing the radius-rod, which, heretofore, has been the same screw that held the axle, has been difficult of access and frequently almost impossible to loosen by hand when firmly set.

With other types of tracers it has been customary to provide a socket on the tracer for receiving the end of a radius rod. Such a construction makes it unnecessary to remove the axle, but the radius rod can be inserted from only one side, and the center must be adjustable along the rod in order to change the radius.

The principal object of this invention is to provide a tracer with an opening through which a radius rod can be passed from either side of the tracer without removing the axle of the tracer wheel. This construction can be used with radius rods having centers which are not adjustable along the rod, because the length of the radius is determined by the distance that the rod is inserted through the opening in the tracer. The length of the radius is set by the same operation which connects the tracer to the radius rod.

Another feature of the invention is the provision of a screw for clamping the radius-rod, the head of which screw is carried beyond the periphery of the tracer wheel, together with means for supporting the extended shank of the screw so that it is protected from injury.

The accompanying drawings show the preferred embodiment of the invention and illustrate one of the possible forms of frame or universal movement structure to which the torch and tracer may be applied.

Fig. 3 is a view on a still larger scale of the tracer, partly in elevation and partly in section, the radius-rod not being present, and the driving motor being partly broken away.

Fig. 4 is a section taken on the line 4—4 of Fig. 3, with the radius-rod in place.

Fig. 5 is a fragmentary view, partly in elevation and partly in section, showing more particularly the extended screw for clamping the radius-rod and the manner in which this screw is supported.

Figure 1:
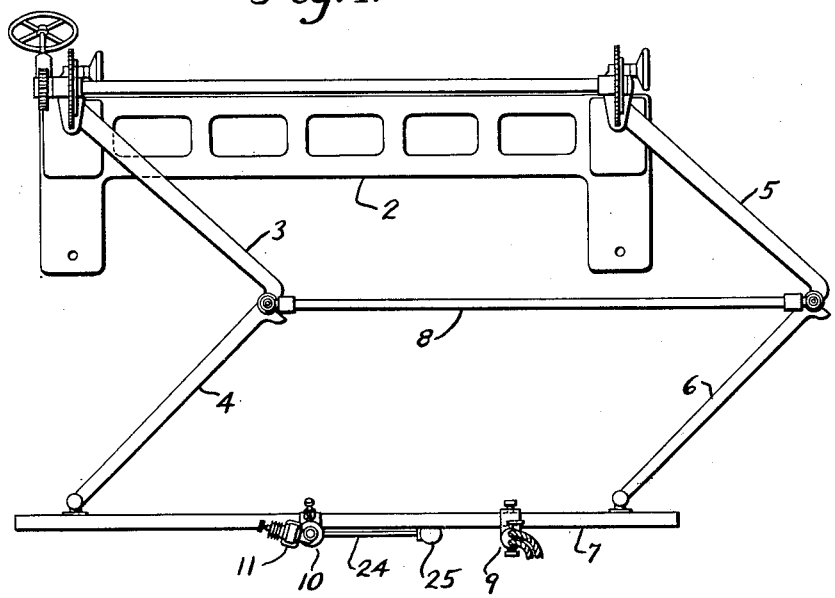
Fig. 1 is a plan view of such a machine, indicating a radius-rod applied to the tracer.
Figure 2:
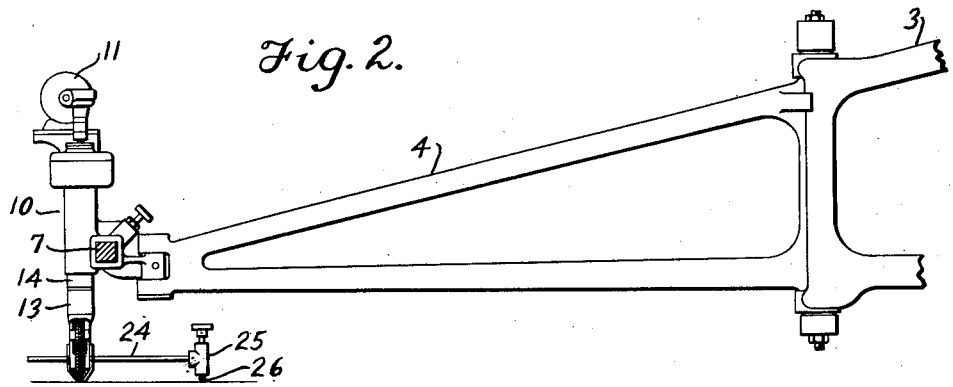
Fig. 2 is a fragmentary side elevation on a larger scale, a bar of the frame being in section.

The machine chosen for illustration has a base 2, and two pairs of swinging jointed arms 3, 4 and 5, 6, connected by a front bar 7 and an intermediate bar 8. The torch 9 and the tracer 10 mounted on or connected with the front bar are consequently movable in all directions parallel with a plane, the torch being compelled to move in accordance with the movement of the tracer. As previously stated, any form of frame or device having such capabilities may be employed.

The tracer is driven by an electric motor 11, as usual, a vertical driving shaft 12 extending downward through a part 13 which is swiveled to turn on a vertical axis in a sleeve 14. A worm 15 on the lower end of said shaft meshes with a worm-wheel 16 having fixed to it a gear-wheel 17, this wheel meshing a gear wheel 18 united to the vertical tracer wheel 19, which is adapted to travel on a drawing or a grooved template. This particular mechanism is shown in the Bucknam patents and may be varied as far as the present invention is concerned.

As before, the swivel 13 terminates in a fork, the limbs 20 and 21 of which embrace the tracer wheel. The lower ends of these limbs have alined openings and heretofore an axle has been secured by a set-screw in these openings to support the tracer wheel with its gear wheel. Consequently, when a radius-rod was to be inserted it was necessary to take out the axle and lay it aside, leaving the tracer temporarily disconnected from the drive and making it necessary to hold the tracer wheel in position with one hand while introducing the radius-rod with the other, the same procedure being required when the radius-rod was taken out and the axle put back.

The novelty of the present invention includes the provision of a support for the driven tracer wheel to turn upon and a hollow holder enabling the radius-rod to be inserted and passed through the wheel without disturbing the latter's support. This may be accomplished in specifically different ways, but the simplest and most practical construction is one in which a stationary hollow shaft serves both as an axle for the tracer wheel and as a pierced holder for the radius-rod.

The hollow axle 22 serves these purposes. It is received at its ends in the openings of the limbs 20 and 21 and may be fixed in place by a set-screw 23 in the limb 20, this screw permitting the axle and the tracer wheel to be removed for purpose of repair. Ordinarily, however, the axle remains in place, and it is not taken out when a radius-rod is to be applied.

The bore of this hollow axle is designed to receive a radius-rod 24, having a head 25 at one end carrying a center point 26. Such radius-rods are known, and the rod itself forms no part of my invention. It will be understood that when the machine is in operation for other than circular or circular arc work, the radius-rod is not in place.

The radius-rod can be moved through the tracer wheel more or less, depending upon the radius desired, that is to say the distance between the center point 26 and the tracer, and it can be inserted from either side of the wheel. At any desired adjustment, it is secured by another set-screw 27, which is carried by the limb 21.

This screw has a long shank and is provided with a knurled head 28, which is carried beyond the rim of the wheel 19, where it is easy to operate it without using a tool. A screw of this length would, however, be subject to bending or breaking, and I have therefore provided the limb 21 with a boss or extension 29 which encloses the shank and affords it lateral support over almost its entire length, or at least for a substantial part of its length.

The operation of the invention will be readily understood from the foregoing description, and it will be evident that numerous changes may be made in the details of construction without departing from the scope of the invention defined in the appended claims.

I claim:

1. In a machine of the character described, a tracer comprising a swiveled part, a driven wheel part, and means on said swiveled part providing a support on which said wheel part turns and a hollow radius-rod holder open at both ends so that a radius-rod can be inserted and passed completely through the wheel part without disturbing the support thereof.

2. In a machine of the character described, a swiveled tracer having a driven wheel part, a stationary hollow axle for said wheel part, said axle being open at both ends, and means for securing a radius-rod in said axle.

3. In a machine of the character described, a tracer comprising a swiveled part, a driven wheel part, means on said swiveled part providing a support on which said wheel part turns and a hollow radius-rod holder open at both ends so that a radius-rod can be inserted and passed completely through the wheel part without disturbing the support thereof, and means for clamping a radius-rod in said holder, said clamping means having an operating head carried beyond the periphery of said wheel part.

4. In a machine of the character described, a swiveled part, a driven wheel part, a radius rod holder enabling a radius-rod to be passed through the wheel part, a boss on said swiveled part extended from said holder outward toward the periphery of said wheel part, and a radius-rod clamping screw in said boss having its head beyond the periphery of the wheel part.

HAROLD J. GROW.